United States Patent [19]

Ribarich

[11] Patent Number: 5,451,845
[45] Date of Patent: Sep. 19, 1995

[54] DEVICE FOR PROTECTING A BALLAST CIRCUIT FROM EXCESS VOLTAGE

[75] Inventor: Thomas Ribarich, Glarus, Switzerland

[73] Assignee: Knobel AG Lichttechnische Komponenten, Ennenda, Switzerland

[21] Appl. No.: 280,538

[22] Filed: Jul. 26, 1994

[30] Foreign Application Priority Data

Jul. 27, 1993 [EP] European Pat. Off. ............ 93111953

[51] Int. Cl.⁶ .............................................. H05B 37/02
[52] U.S. Cl. ..................................... 315/225; 315/224; 315/291; 315/209 R; 361/15; 361/18; 363/37
[58] Field of Search ................ 315/225, 224, 291, 307, 315/127, 209 R, DIG. 7; 361/15, 18, 98, 100, 101, 111; 363/37, 49, 56

[56] References Cited

U.S. PATENT DOCUMENTS

| | | | |
|---|---|---|---|
| 4,441,053 | 4/1984 | Daspit | 315/307 X |
| 4,710,682 | 12/1987 | Zuchtriegel | 315/224 |
| 4,891,728 | 1/1990 | Preis et al. | 361/18 |
| 4,935,836 | 6/1990 | Labbus et al. | 361/15 |
| 4,996,464 | 2/1991 | Dodd et al. | 315/289 |
| 5,032,968 | 7/1991 | Mikami et al. | 363/37 |
| 5,313,145 | 5/1994 | Francis, Jr. et al. | 315/225 X |

FOREIGN PATENT DOCUMENTS 0272514 6/1988 European Pat. Off. .
0339598 11/1989 European Pat. Off. .

*Primary Examiner*—Robert J. Pascal
*Assistant Examiner*—Haissa Philogene
*Attorney, Agent, or Firm*—Sandler, Greenblum & Bernstein

[57] ABSTRACT

A device for protecting a ballast circuit from excess voltage and excess current includes a switch for disconnecting the ballast circuit from the power source and a control circuit for operating this switch; the control circuit monitoring a control point, from which control point a first resistor connects to a first terminal of the power source, a second resistor connects to a second terminal of the power source, and a third resistor connects to a point between the switch and the ballast, the switch being brought into off-state when the voltage between the control point and the first terminal of the power source exceeds a given value, thus leading to a hysteresis between an input voltage for switching the device off and an input voltage for switching the device back on again, with positive feedback being provided by the third resistor for decreasing the switch-off time and the corresponding switching losses.

8 Claims, 2 Drawing Sheets

5,451,845

DEVICE FOR PROTECTING A BALLAST CIRCUIT FROM EXCESS VOLTAGE

CROSS REFERENCE TO RELATED APPLICATIONS

This application claims the priority of European Patent Application No. 93 111 953.1, filed Jul. 27, 1993, the disclosure of which is incorporated herein by reference in its entirety.

BACKGROUND OF THE INVENTION

1. Field of the Invention

The invention relates to a device for protecting a ballast circuit from excess voltages. Such devices are e.g. used in combination with ballast circuits for gas discharge lamps.

2. Discussion of the Background of the Invention and Material Information

In electronic ballast circuits for sine-shaped input current, boost converters are used comprising a capacitor as a storage element. In such devices a starting resistor is provided for limiting the input current during start-up. Once the capacitor is loaded, the starting resistor is shunted by a relay, a triac or a thyristor. Such start-up current limiters are described, for example, in the Siemens application notes PD22 8905 and PD22 9002, published by Siemens AG of Munich, Germany as well as in U.S. Pat. No. 5,032,968. A disadvantage of these circuits is the electric loss during normal operation caused by the voltage drop over the shunting element. This loss is the product of this voltage drop times the input current. A further disadvantage, when using a triac or a thyristor, is that these devices can only be opened when no current flows through them. Therefore, they cannot be opened for disconnecting the ballast if an excess voltage should be detected.

The description of the pre-regulator UC 3854 of the Unitrode Integrated Circuits Corporation of Merrimack, N.H., on pages 6–14, discloses the buck-topology for input current limitation with pulse width modulation. The control circuits for pulse width modulation are, however, complicated. After termination of the start-up procedure during normal operation the switch, which was periodically opened and closed during start-up for limiting the current, is closed permanently. No further protection of the capacitor and the following load is provided if a transient or permanent excess voltage should be applied to the device.

European Patent Publication No. EP 339 598 describes a protective circuit for capacitive loads comprising a control arrangement of comparators for detecting an excess voltage or an excess current. The control arrangement drives a switch for disconnecting the load when the current or the voltage exceed their maximum values. This circuit is expensive because it requires a large number of components, e.g. several amplifiers and logic circuits.

SUMMARY OF THE INVENTION

It is a general object of the invention to provide a device for protecting a ballast circuit that avoids the disadvantages of the previously described solutions without requiring a large number of components.

In order to implement these and still further objects of the invention, which will become more readily apparent as the description proceeds, the device manifested in a first embodiment of the invention comprises an electronic switch substantially arranged in series with the ballast circuit between a first power terminal of the power source and a first input terminal of the ballast circuit, a driving circuit for driving the electronic switch, the driving circuit comprising a threshold voltage monitor designed to monitor a control voltage between a control point and the first power terminal, wherein the control point is connected to the first power terminal, through a first resistor, to a second power terminal of the power source, through a second resistor, and to the first input terminal through a third resistor.

In a further embodiment of the device of this invention, the threshold voltage monitor opens the switch for disconnecting the ballast when the control voltage exceeds a threshold voltage.

In another embodiment of the device of this invention, the threshold voltage monitor comprises at least one Zener diode for determining the threshold voltage and a current in the Zener diode causes the switch to be opened.

In a different embodiment of the device of this invention, the Zener diode is connected to a base of a transistor and a closing of the transistor causes a control voltage of the switch to be decreased.

A yet further embodiment of the device of this invention, includes a thyristor circuit and means for triggering the thyristor circuit when a current in the switch exceeds a maximum current value.

A still different embodiment of the device of this invention includes a thyristor circuit and means for triggering the thyristor circuit when a current in the switch exceeds a maximum current value, wherein the thyristor circuit is arranged parallel with the transistor.

In yet other embodiments of the devices of this invention, the switch is an N-channel field effect transistor or an insulated gate bipolar transistor.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

Figure 1:
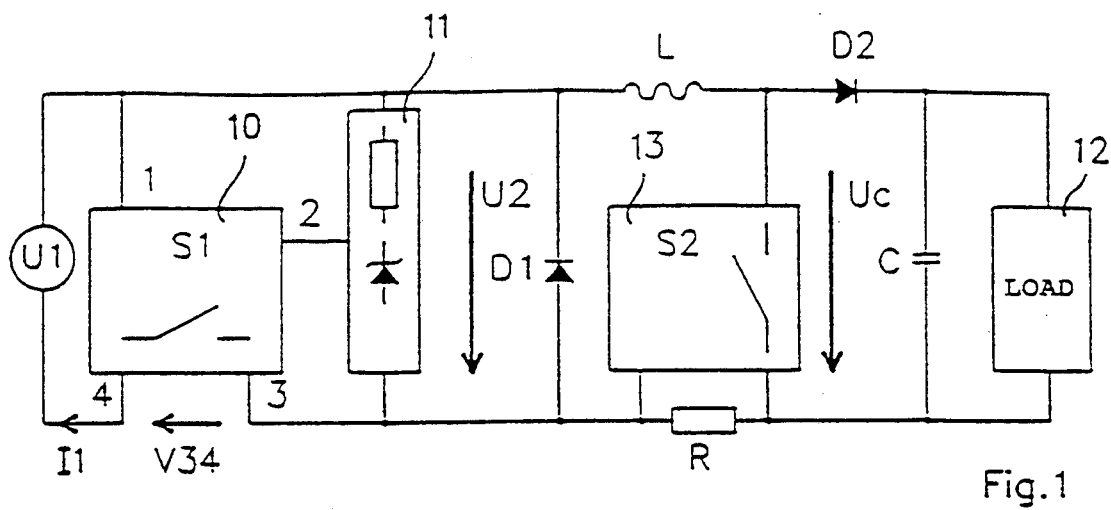
FIG. 1 is a block diagram of an electronic ballast and a protecting device.

FIG. 1 is a block diagram of a circuit with a power source U1, a protective device or circuit 10 with a switch, S1 for limiting the input current I1 and the input voltage, a voltage supply 11 for protective circuit 10, a first diode D1, a boost converter comprising an inductive element L, a switch S2, a measuring resistor R, and a diode D2, as well as a capacitor C and a load 12. The load 12 itself is a driving circuit for a gas discharge lamp as it is known to a person skilled in the art.

This initial discussion pertains to the case where the input voltage is a full-wave rectified sine-shaped line voltage. In this case power source U1 comprises a full-wave rectifier and a filter for filtering the high frequency noise of the power supply of load 12. For the sake of simplicity, these elements, which are well known to a person skilled in the art, are not shown.

If the supply voltage is switched on and at its maximum value and no current limitation is provided, the start-up current is limited only by the internal resistance of power source U1, the filter and the inductance L. Therefore, the circuits shown here are designed to limit the input current, either by switching on a switch S1 when the input voltage is zero, or by periodically switching switch S1 on and off during start-up. For this purpose, the protective circuit 10 provides a switch S1 between a first terminal of the power source U1 (at terminal 4) and a first input terminal of the boost converter i.e. conductive element L, (at terminal 3). Before switch S1 is closed for the first time, the voltage over capacitor C is usually zero and the voltage over switch S1 is equal to the input voltage.

If switch S1 is closed when the input voltage is zero, the maximum start-up current I1max is given by the capacitor C and the line frequency f by:

$$I1max = 2 \cdot f \cdot C \cdot U1max.$$

If this maximum start-up current I1max does not exceed the ratings of the circuit elements, switch S1 can remain closed during start-up. For this purpose the voltage supply 11 supplies a voltage to terminal 2 of switch 1.

Terminal 1 of switch S1 is connected to a second terminal of the power source U1 and is used for monitoring the value of the input voltage. When the input voltage exceeds a given threshold value, switch S1 is opened for protecting capacitor C and load 12. When the input voltage goes back to zero, switch S1 is closed again. This allows operation of the ballast circuit even if the input voltage is continuously too high, a situation that can, e.g., occur when the neutral conductor of the line is interrupted.

The voltage supply 11 for terminal 2 is schematically represented by a Zener diode and a resistor. In practice, it will usually be part of the block 13 driving the boost converter or it can be derived from a voltage in the load 12, which contains the driving circuit of the lamp.

Figure 2:
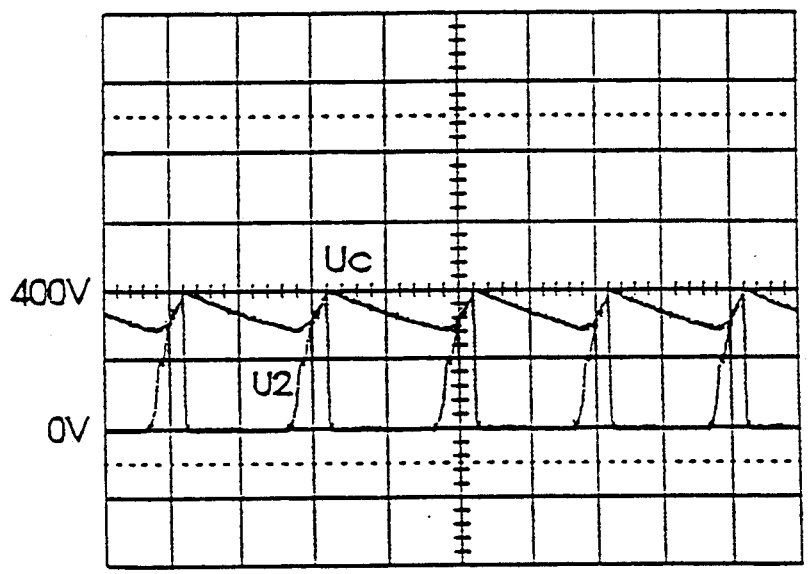
FIG. 2 shows the voltage curves when an excess voltage is applied from the power source.

FIG. 2 shows two voltage-time curves for illustrating the operation of the switch S1 under excess voltage from the power source U1. The upper curve shows the voltage Uc over the capacitor C, the lower curve shows the voltage U2 over the diode D1.

Switch S1 is closed when the input voltage of power source U1 is 0 V. Once the voltage of power source U1 exceeds a predefined threshold value of 400 V, switch S1 is opened and voltage U2 falls back to 0 V. The voltage Uc shows that the capacitor C is loaded to a voltage of 400 V while switch S1 is closed. If the components of the device are designed properly, they can work for an infinite time under the excess voltage situation shown in FIG. 2. Measurements have shown that the present device can be operated with line voltages of up to 450 volts without suffering damage.

Figure 3:
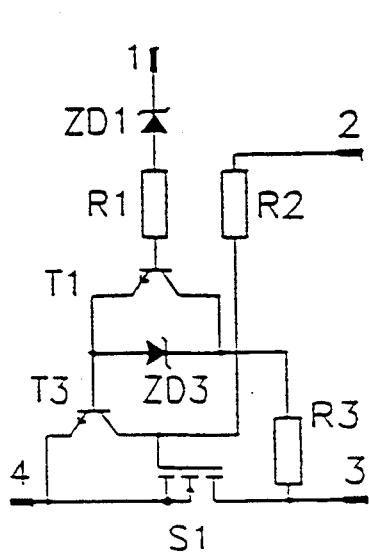
FIG. 3 shows a detailed diagram of a protective circuit with a zero-voltage switch.

FIG. 3 shows an embodiment of the protective electronics. An insulated gate bipolar transistor (IGBT) or an N-channel field effect transistor are preferably used as switch S1. When the voltage between terminals 3 and 4 exceeds the breakthrough voltage of the Zener diode ZD3, a transistor T3 is closed and interrupts switch S1. Only when the voltage between the terminals 3 and 4 falls back to a value below the voltage of the Zener diode ZD3, is transistor T3 opened again, the gate-source voltage of switch S1 can increase, and switch S1 is closed. Therefore, switch S1 is switched on while the voltage between terminals 3 and 4 is substantially zero or small. Terminal 2 is used to supply a constant voltage between 5 and 15 volts to the gate of switch S1. Resistor R2 can be chosen to be large, because the time for switching on is in the range of the line frequency and because the voltage over resistor R2 can be large when switch S1 is open.

Figure 4:
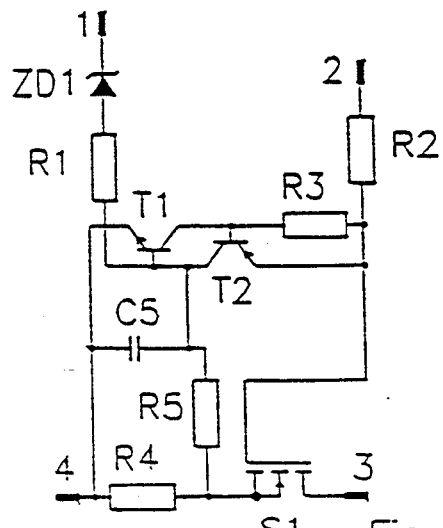
FIG. 4 shows a detailed diagram of a circuit with current limitation.

FIG. 4 shows another embodiment of a protective device. Here, the moment for switching on switch S1 is not derived from the voltage between terminals 3 and 4. Rather, the current is regulated actively by switching switch S1 off as soon as the current exceeds a maximum value and switching it back on after a predetermined time.

In the circuit of FIG. 4, switch S1 is closed as soon as a sufficient supply voltage is applied to terminal 2. The input current I1 flows through the measuring resistor R4 and once current I1 exceeds its maximum value I1max, the gate-source-voltage of switch S1 is shunted by the thyristor formed by transistors T1 and T2. The maximum input current I1 can be derived from the gate-voltage of the thyristor assembly T1, T2 and the value of the measuring resistor R4:

$$I1max = 0.6 \; V/R4.$$

Resistor R3 is adjusted such that the "thyristor" T1, T2 can be fired and thereby be closed, but once it is closed and the gate capacity of switch S1 has been discharged, the voltage over resistor R3 becomes too small to keep transistor T2 in its on-state. Once capacitor C5 is discharged through resistor R5 and transistor T1, the thyristor is completely switched off. Therefore, resistor R5 and capacitor C5 determine the time during which switch S1 remains interrupted. Then, switch S1 is switched back to on-state. This switching on and off of switch S1 continues until the input current I1 remains below I1max. Then switch S1 remains closed in normal operation.

In FIGS. 3 and 4, the Zener diode ZD1 defines a maximum value of the input voltage from power source U1. Once the input voltage is larger than this maximum value, a current begins to flow through Zener diode ZD1. In FIG. 4, this current fires the thyristor T1, T2 and switches off switch S1 to protect the capacitor C (FIG. 1) of the ballast circuit.

The circuit according to FIG. 4 can be combined with the zero-voltage switch of FIG. 3 if it is to be operated with a rectified AC voltage. Similarly, the circuit of FIG. 3 can be combined with the thyristor circuit T1, T2 of FIG. 4.

Figure 5:
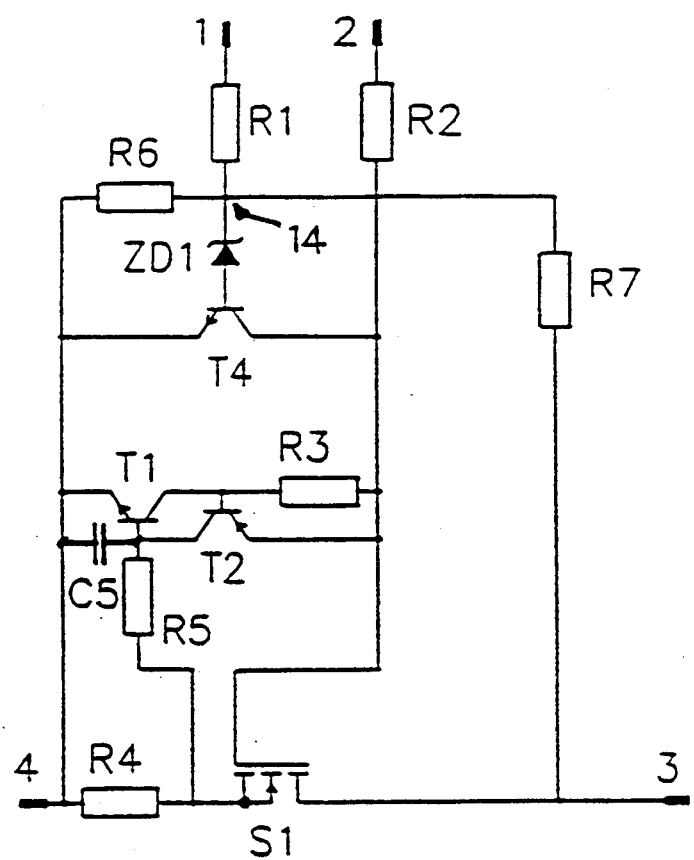
FIG. 5 shows a detailed diagram of the preferred embodiment of the invention with hysteresis characteristics.

FIG. 5 shows the preferred embodiment of the present invention. The illustrated circuit offers a dynamic limitation of the input current and a switching hysteresis for voltage limitation.

The limitation of the input current I1 is implemented in the same way as in the circuit of FIG. 4. Once the current exceeds its limit I1max, the thyristor circuit T1, T2 is switched on. It discharges the gate capacity of switch S1 and will then remain in its on-state until capacitor C5 is discharged as well. If capacitor C5 is omitted, the on-state will end as soon as the gate capacity of switch S1 is discharged. Then the thyristor circuit T1, T2 is switched to its off-state and switch S1 is switched back on. In this way, current I1 is limited to the maximum value given by measuring resistor R4, and the capacitor C (FIG. 1) is charged with repetitive current pulses. Once capacitor C is sufficiently charged and during normal operation, switch S1 remains closed. The input voltage of power source U1 (FIG. 1) can either be a rectified AC voltage or it can be a constant DC-voltage.

Similar to FIG. 4, transistor T4 and Zener diode ZD1 are provided as a threshold voltage monitor for switching switch S1 off in the presence of an excess voltage between terminals 1 and 4. Transistor T4 is activated as soon as the control voltage between terminal 4 and a control point 14, given by the common terminals of resistors R1, R6 and R7, exceeds a threshold voltage.

When switch S1 is closed, resistor R7 is substantially parallel to resistor R6. Therefore, the threshold value $U1_{off}$ for the input voltage at which the transistor T4 is switched on and switch S1 is switched off is given by:

$$U1_{off} = (V_{ZD1} + 0.6) \cdot (1 + R1/R7 + R1/R6),$$

where $V_{ZD1}$ denotes the break through voltage of the Zener diode ZD1.

Once the input voltage exceeds $U1_{off}$, switch S1 is opened for protecting the ballast circuit and especially capacitor C. When switch S1 is in its off-state, the whole input voltage U1 lies over switch S1, because switch S2 (FIG. 1) of the boost converter is closed for feeding energy into capacitor C. Since no current flows through the inductance L, switch S2 remains closed. As a consequence, resistor R7 is now parallel to resistor R1, and switch S1 will be closed again once the input voltage falls below a second threshold value $U1_{on}$:

$$U1_{on} = (V_{ZD1} + 0.6) \cdot (1 + 1/(R6/R7 + R6/R1)).$$

The switching hysteresis $U1_{off}-U1_{on}$ can be defined by a suitable choice of the resistors R1, R6 and R7 and the voltage $V_{ZD1}$. If one chooses e.g. $V_{ZD1} = 15$ V, R1=25 R, R7=250 R and R6=R, the threshold values $U1_{off}$=407 V and $U1_{on}$=370 V are obtained.

The circuit of FIG. 5 not only has the advantage of separately adjustable threshold values for switching switch S1 off and on, but the positive feedback action caused by resistor R7 also leads to a faster discharge of the gate capacity of switch S1 and thereby reduces the switching losses in switch S1.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A device for protecting a ballast circuit from excess voltages in a power source, the device comprising:
    an electronic switch substantially arranged in series with the ballast between a first power terminal of the power source and a first input terminal of the ballast circuit;
    a driving circuit for driving the electronic switch, the driving circuit comprising a threshold voltage monitor for monitoring a control voltage between a control point and the first power terminal;
    wherein the control point is connected to the first power terminal, through a first resistor, to a second power terminal of the power source, through a second resistor, and to the first input terminal through a third resistor.

2. The device of claim 1 wherein the threshold voltage monitor opens the switch for disconnecting the ballast when the control voltage exceeds a threshold voltage.

3. The device of claim 2, wherein the threshold voltage monitor comprises at least one Zener diode for determining the threshold voltage and wherein a current in the Zener diode causes the switch to be opened.

4. The device of claim 3 wherein the Zener diode is connected to a base of a transistor and wherein a closing of the transistor causes a control voltage of the switch to be decreased.

5. The device of claim i further comprising a thyristor circuit and means for triggering the thyristor circuit when a current in the switch exceeds a maximum current value.

6. The device of claim 4 further comprising a thyristor circuit and means for triggering the thyristor circuit when a current in the switch exceeds a maximum current value, wherein the thyristor circuit is arranged parallel with the transistor.

7. The device of claim 1 wherein the switch is an N-channel field effect transistor.

8. The device of claim 1 wherein the switch is an insulated gate bipolar transistor.

* * * * *